US008601567B2

(12) United States Patent
Spatscheck et al.

(10) Patent No.: US 8,601,567 B2
(45) Date of Patent: Dec. 3, 2013

(54) FIREWALL FOR TUNNELED IPV6 TRAFFIC

(75) Inventors: Oliver Spatscheck, Randolph, NJ (US); Subhabrata Sen, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 211 days.

(21) Appl. No.: 12/387,931

(22) Filed: May 8, 2009

(65) Prior Publication Data

US 2011/0004932 A1    Jan. 6, 2011

(51) Int. Cl.
*G06F 9/00* (2006.01)
(52) U.S. Cl.
USPC .............................. 726/13; 726/14
(58) Field of Classification Search
None
See application file for complete search history.

(56) References Cited

U.S. PATENT DOCUMENTS

| 2002/0073215 A1* | 6/2002 | Huitema et al. ............... 709/230 |
| 2004/0059942 A1* | 3/2004 | Xie ................................. 713/201 |
| 2004/0246991 A1* | 12/2004 | Tsuzuki et al. ............... 370/466 |
| 2006/0215652 A1* | 9/2006 | Strandridge et al. ......... 370/389 |

OTHER PUBLICATIONS

McGann et al, IPv6 Packet Filtering, Jan. 2005, Department of Electronic Engineering, National University of Ireland Maynooth, p. 1-130.*

* cited by examiner

*Primary Examiner* — Teshome Hailu
(74) *Attorney, Agent, or Firm* — Myers Bigel Sibley & Sajovec, P.A.

(57) ABSTRACT

A NAT device and method implemented on the device for filtering tunneled IPv6 traffic is disclosed. The method comprises: receiving an IP traffic stream at an ingress network interface to the NAT, performing deep packet inspection on the traffic stream to detect the tunneled IPv6 packets, and applying a filter to the IPv6 packets.

16 Claims, 4 Drawing Sheets

FIREWALL FOR TUNNELED IPV6 TRAFFIC

FIELD OF THE INVENTION

The present invention relates generally to communications networks, and more particularly, to a methodology and system for filtering tunneled Internet Protocol version 6 (IPv6) traffic in a Network Address Translation (NAT) box.

BACKGROUND OF THE INVENTION

Internet Protocol (IP) is a packet-based communication protocol in which addressed packets are forwarded by packet routers through a communication network between network access devices. Internet Protocol version 4 (IPv4) utilizes a 32-bit addressing scheme and is currently the most dominant IP version. In 1998 the Internet Engineering Task Force (IETF) designated IPv6 as the successor to IPv4 through the publication of a new Standards Track Specification RFC 2460. IPv6 utilizes a 128-bit address that provides greater flexibility in allocating addresses and routing traffic and eliminates the need for NAT, which has been widely deployed to alleviate IPv4 address exhaustion.

FIG. 1 is a high-level schematic of an illustrative prior art IP network 100 including a legacy IPv4 network 102 interconnected by gateways to IPv6 networks 104 and 106. IPv4 network 102 supports a plurality of nodes (i.e., network access devices) 108, 110, 112. IPv6 networks 104 and 106 likewise support nodes 112 and 114, respectively. The network access devices are connected to the respective IP networks in several ways, including via an Internet Service Provider (ISP) or a Local Area Network (LAN) such as LAN 116, though which network access device 108 accesses network 102. Network access device 108 is disposed behind a NAT 124 in a manner well known to those skilled in the art.

To facilitate routing across the various IP networks, tunnel protocols are utilized to define paths for IP traffic as is well known. Similarly, tunnel protocols have been established for IPv6 to permit tunnels to be set up across the IPv4 and IPv6 networks. The latter are dynamically set up by tunnel servers, i.e., 120 and 122 that reside between IPv4 and IPv6 networks. When a network access device (e.g., 108) resides behind a NAT 124, an application establishes a special open-ended tunnel through the NAT 124 to a dual-stacked network access device on the Internet. IPv6 packets are tunneled through a single User Datagram Protocol (UDP) port on the NAT 124 and thus each IPv6 packet resides inside a UDP header, which in turn is encapsulated inside an IPv4 header. An example of such a tunneling protocol is known as Teredo, which was developed by Microsoft® and typically enabled by default in Windows Vista and Longhorn, and available in earlier versions such as Windows XP and the like. The Teredo framework comprises clients, relays and servers. A Teredo client executing on a network access device utilizes the Teredo protocol to reach another peer on the IPv6 network. The clients are dual-stack (IPv4 and IPv6 nodes) that may be disposed behind one or more IPv4 NATs (e.g., 124). The Teredo client thus always sends and receives Teredo IPv6 traffic tunneled in UDP over IPv4.

Tunneling protocols such as Teredo have serious security implications for those network access devices that are situated behind a NAT. The open-ended tunnel can bypass pre-existing IPv4 based network filters such as firewalls and the like. This is an obvious concern for those who set-up and maintain network security since such controls are generally focused on protecting the internal network and/or enforcing access policies. Although NATs are generally not considered security devices, the restrictions they impose on traffic traversing the box provide a security benefit. Thus, when such network security controls on an IPv4 NAT are bypassed in this manner, the security burden shifts to the client host.

In view of the above, it would be advantageous to provide a mechanism whereby filtering rules on a NAT can be applied to tunneled IPv6 packets.

SUMMARY OF THE INVENTION

In accordance with an aspect of the present invention, there is provided a method for filtering tunneled IPv6 traffic at a NAT device. The method comprises the steps of: receiving an IP traffic stream at an ingress network interface to the NAT; performing deep packet inspection on the traffic stream; detecting tunneled IPv6 packets; and applying a filter to the IPv6 packets.

In accordance with another aspect of the invention, there is provided a NAT device for filtering tunneled IPv6 traffic. The NAT device comprises: an ingress network interface that receives an IP traffic stream, the traffic including IPv4 traffic and tunneled IPv6 traffic; a deep packet inspection module coupled to the ingress interface for performing deep packet inspection on the traffic and identifying the tunneled IPv6 packets; and a packet filter for filtering the IPv6 packets.

In accordance with yet another aspect of the invention, there is provided a memory medium including machine readable instructions encoded thereon, which when executed by at least one processor, cause a NAT device to: receive an IP traffic stream from an ingress network interface to the NAT; perform deep packet inspection on the traffic stream; detect tunneled IPv6 packets; and apply a filter to the IPv6 packets.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout to the extent possible. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
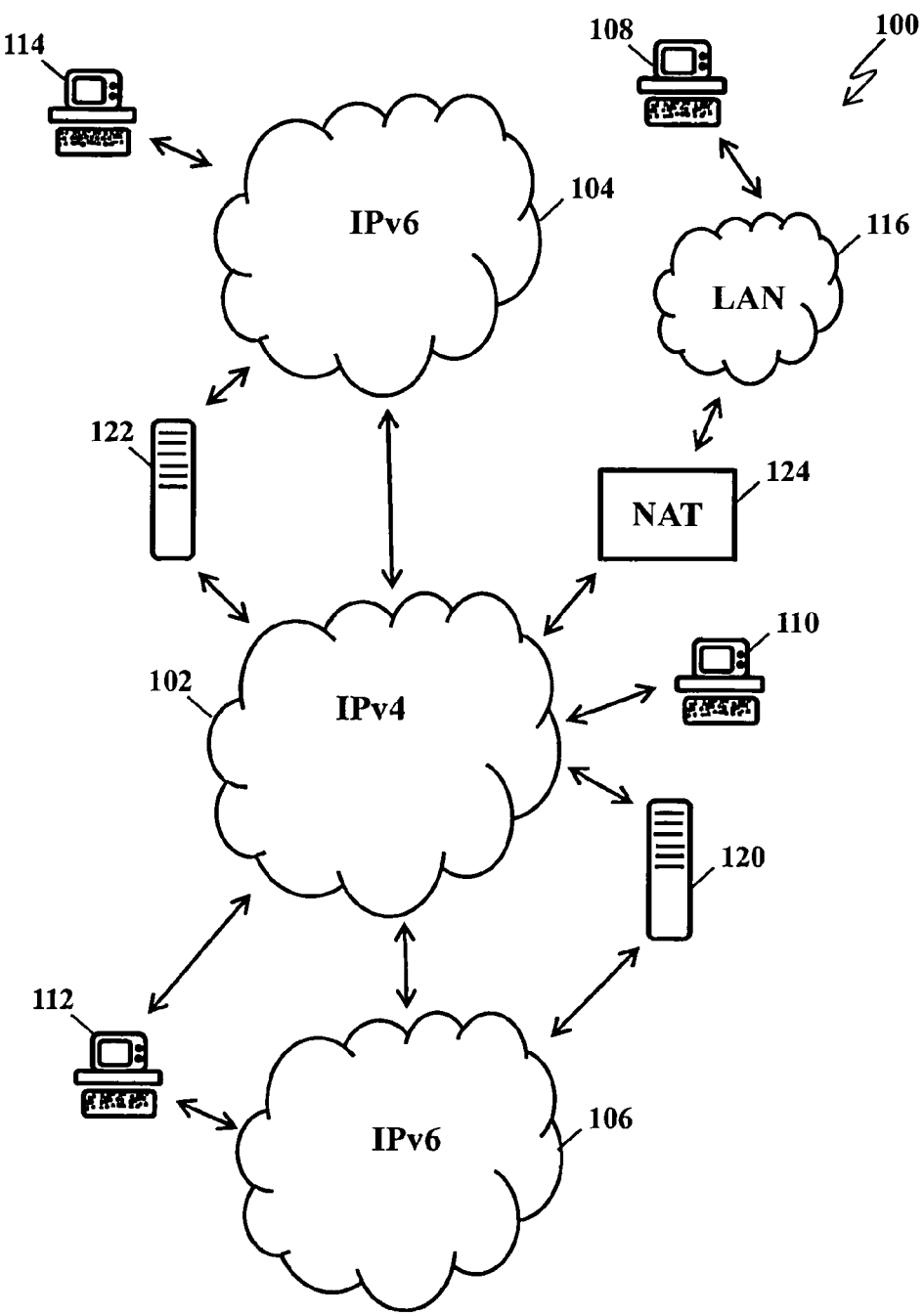
FIG. 1 is a schematic of an illustrative prior art communications network for carrying out aspects of the present invention.
Figure 2:
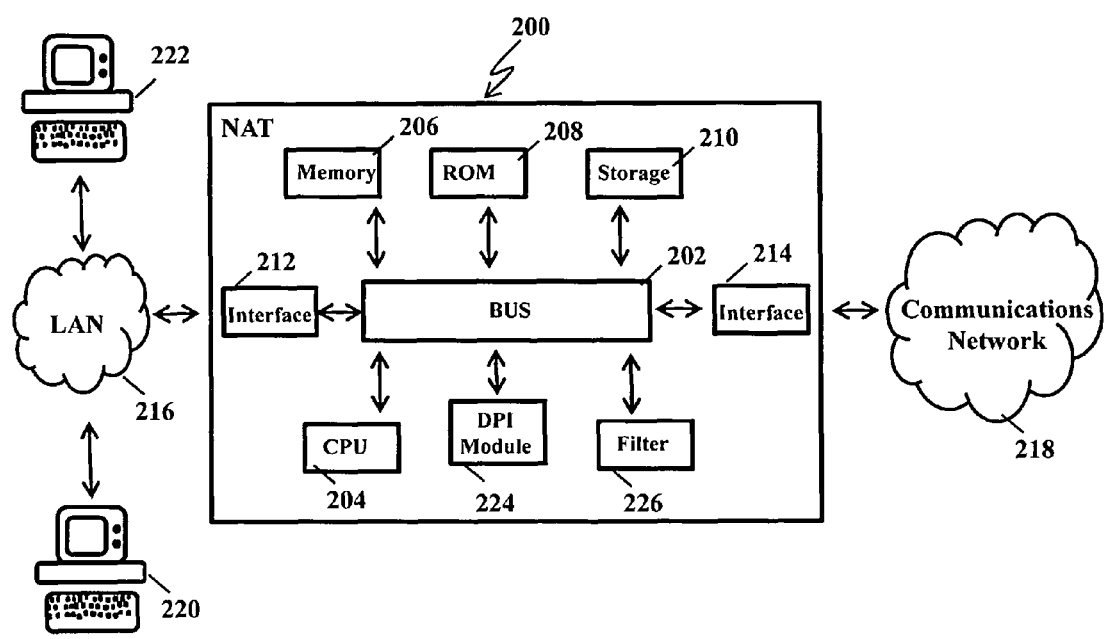
FIG. 2 is a schematic of an exemplary NAT device in accordance with an aspect of the invention.

FIG. 2 is a schematic of a NAT device 200 ("NAT" 200) in accordance with an aspect of the present invention, which generally includes a communications bus 202 and a central processing unit 204. The NAT 200 further includes a main memory 206 such as random access memory (RAM), a read only memory (ROM) 208 and secondary memory 210 such as a hard disk drive, optical disk, flash memory and/or any other type of removable storage medium. The removable storage has read/write functionality onto removable storage media having stored therein computer software program instructions and/or data. In alternative embodiments, secondary memory 210 may include other similar devices for allowing computer programs or other instructions to be loaded into NAT 200. Such devices may include, for example, a removable storage unit and an interface such as a program cartridge and cartridge interface, a removable memory chip (such as an erasable programmable read only memory (EPROM), or programmable read only memory (PROM)) and associated socket, and other removable storage units which allow software and data to be transferred from the removable storage unit to computer system NAT 200. Computer programs may also be received via communications interfaces 212, 214, and when executed, enable the NAT 200 to perform the features of the present invention, as discussed herein. In an embodiment where aspects of the invention are implemented using software, the software may be stored in a computer program product and loaded into NAT 200 using a removable storage, hard drive or communications interfaces 212, 214. The control logic (software), when executed by the processor 204, causes the processor 204 to perform the functions of the invention as described herein. Alternatively, in another embodiment the invention may be implemented primarily in hardware using, for example, hardware components, such as application specific integrated circuits (ASICs). Implementation of the hardware state machine so as to perform the functions described herein will be apparent to persons skilled in the relevant art(s).

NAT 200 further includes a plurality of communications interfaces 212 and 214 for respectively connecting on one side to a LAN 216 and on the other side, to a communications network 218. The NAT 200 is configured to an Internet standard in a router or other element as is well known in the art to receive each packet from an internal private network such as LAN 216 and modify the IP header to include the global IP address of the router in the originating address field prior to transmitting the packet to the Internet (i.e., communication network 218). The NAT 200 stores the internal IP address of the originating network access device (i.e., 220 or 222), the destination IP address of a destination node and port number in a NAT state table in memory 206. When the request is returned to the same port form the destination IP address, the NAT 200 matches the destination IP address with a stored destination address saved when the request was sent and modifies the IP header to insert a corresponding stored internal originating IP address as the destination address for the request. The NAT 200 is thus transparent to the network access devices 220, 222. In the case of IPv6, an IPv6-in-UDP/TCP IPv4 tunnel may be created through the NAT 200 using a Teredo client executing on the network access devices 220, 222 as known in the art.

In accordance with an aspect of the invention, NAT 200 further includes a Deep Packet Inspection (DPI) module 224 that cooperates with a packet filter 226 as will be explained in more detail hereinbelow. The packet filter contains IPv4 rules of the type well known in the art. Since these cannot be directly applied to encapsulated IPv6 packets, the DPI module 224 implements DPI on the encapsulated IPv6 packets prior to applying the appropriate filtering rules for IPv6 via packet filter 226. The packet filter may include an inspection module that searches packet payloads for patterns corresponding to known malicious codes. Alternatively, the packet filter may be programmed to apply a specified set of rules or policies for enforcing network access as is well known in the art. The specifics of such packet filtering are beyond the scope of this application and thus need not be discussed in detail here.

Since IPv4 and IPv6 are different, the packet filter may contain a set of rules applicable to IPv4 and a separate set of rules that are translated for IPv6. For example, IPv6 addresses may be specified in colon-hexadecimal notation. Thus, two colons (::) can be used once in an address to indicate a series of 0s. The following rule is exemplary to block an inbound telnet connection: block in proto tcp from 2001:db8::1 to 2001:db8::2 port=23.

Any keywords can be specified in IPv6 rules, such as for example, "block in from any to any." Although this rule is valid for both IPv4 and IPv6 packets, it may be applied to IPv6 packets if added to the IPv6 filter configuration file and loaded using the IPv6 (−6) option with the ipf command. As is known to those skilled the art, to filter ICMPv6 messages by type and code, specify proto icmpv6 (or proto ipv6-icmp) and use the keywords icmpv6-type and code. Packets may be passed or blocked according to IPv6 extension headers. An exemplary simplified rule syntax may be block|pass in|out [processing_options] [proto protocol] ip_selector with v6hdrs ipv6_header where: processing_options is one or more processing options, such as quick, ip_selector is the IP address specification using the keyword all, or the from and to keywords and IPv6 addresses and optional ports, protocol is the protocol name or number, and ipv6_header is a series of one of the following IPv6 header extension types, separated by commas (,):

dstopts (Destination options header)
    hopopts (Hop-by-hop options header)
    mobility (Mobile IPv6 Mobility header)
    routing (Routing options header)
    ah (IPsec Authentication Header)
    esp (IPSec Encapsulating Security Payload)
    ipv6 (IPv6 tunneled packets)

Any keywords can be specified in IPv6 rules, such as for example, "block in from any to any." For example, to block all TCP packets with a Routing options header, the following rule may be employed: block in proto tcp from any to any with v6hdrs routing. To block all UDP packets with destination option and mobility headers, the following rule may be applied: block in proto udp from any to any with v6hdrs dstopts, mobility.

IPv6 fragments can be filtered by specifying the v6hdrs frags keywords. An illustrative rule to filter IPv6 fragmented traffic reads: block in proto udp from any to any with v6hdrs frags. Unlike IPv4, a fragment cache is not maintained for IPv6 fragments.

An IPv6 filter supports the return-icmpv6-as-dest and return-icmpv6 keywords for IPv6. These keywords are equivalent to the IPv4 keywords return-icmp-as-dest and return-icmp. The primary use for these keywords is to send an ICMPv6 message with type destination unreachable and code port unreachable in response to UDP packets sent to a blocked port. For example: block return-icmp-as-dest(port-unr) in quick proto udp from any to 2001:db8::2 port=53

The DPI module 224 is shown as a separate block in the schematic of FIG. 2, that may comprises a packet processor and associated instructions for implementing the deep packet inspection. Alternatively, the DPI may be implemented by the CPU 204 operating under instructions stored in memory 208 and/or 210 and loaded into memory 206. The DPI module 224 is configured to monitor data travelling between LAN 216 and communication network 218 and perform a detailed analysis of payload and header information of incoming and outgoing packets therebetween. Generally, DPI refers to inspecting both the header and data payload of a packet, which comprise control data, regular data and/or any other type of information. This is in contrast to "shallow packet inspection," which analyzes packet headers exclusively. In this implementation, DPI is utilized to extract the IPv6 packet from the encapsulated IPv6-in-UDP/TCP IPv4 packet as shown in FIG. 3.

Figure 3:
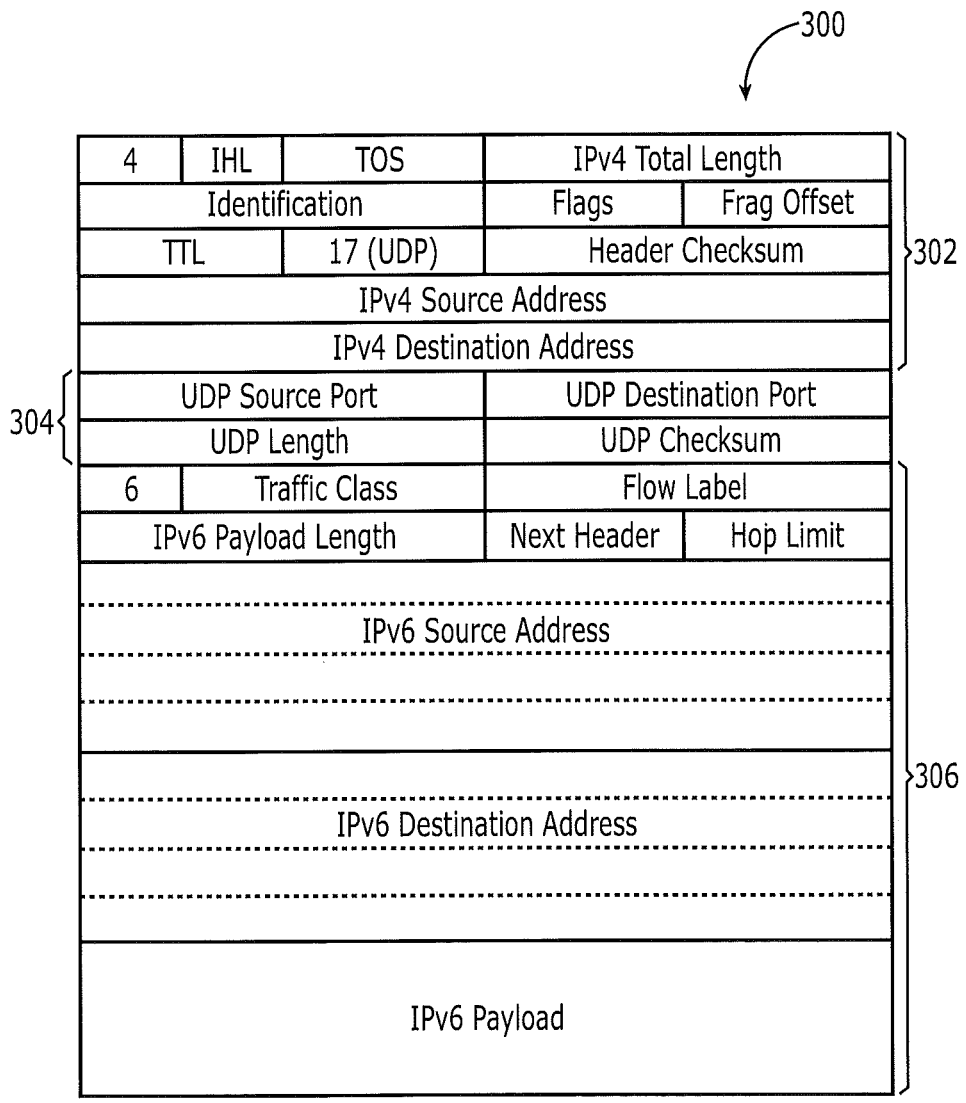
FIG. 3 is a schematic of an illustrative tunneled IPv6-in-UDP/TCP IPv4 packet.

FIG. 3 shows an exemplary IPv6-in-UDP/TCP IPv4 packet 300 encapsulated by Teredo for routing over IPv4. The encapsulated packet includes IPv4 source address, destination address and other information in block 302. The UDP information is contained in block 304 and the inner IPv6 packet including source and destination addresses, and packet payload is contained in block 306.

Figure 4:
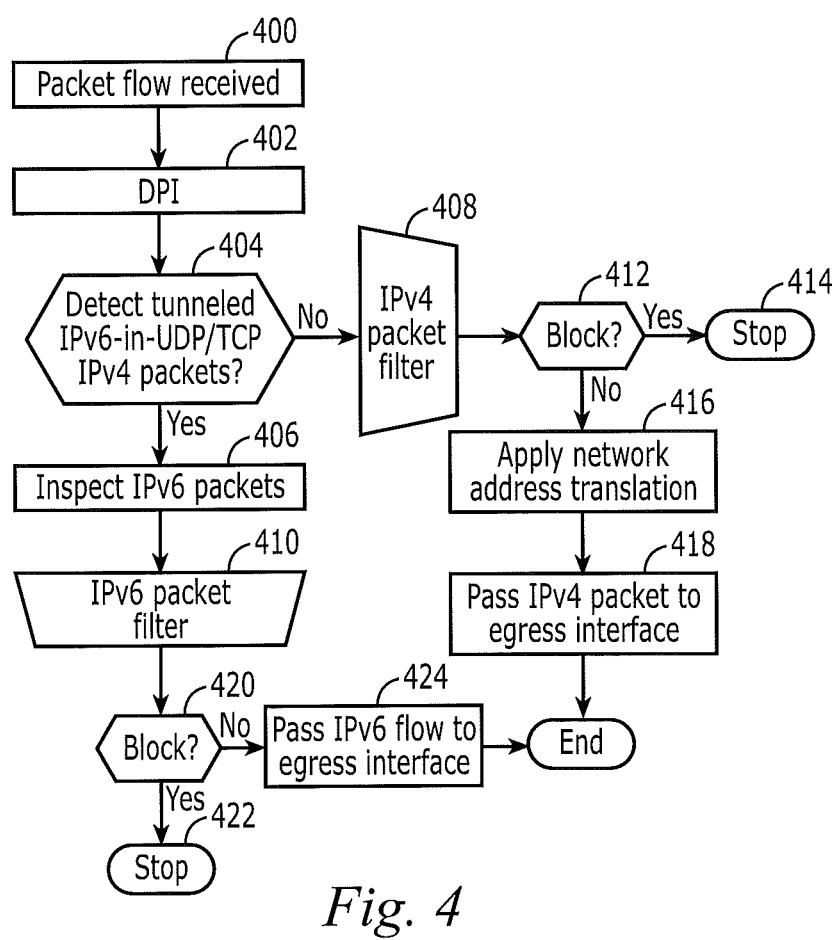
FIG. 4 is a schematic of a flow diagram of an exemplary method in accordance with the present invention.

In accordance with an aspect of the present invention, tunneled IPv6-in-UDP/TCP IPv4 packets, such as the packet illustrated in FIG. 3, are passed to the DPI module 224 (FIG. 2) where the packet processor performs a deep packet inspection on these packets to extract the inner encapsulated IPv6 packets (identified by block 306 in FIG. 3). A flow diagram of an exemplary process is illustrated in FIG. 4, where a packet flow is received at an ingress interface of the NAT at step 400. The packets are received on a media access control receiving unit that supports signaling on the physical layer of the incoming link and may implement an ordering of the arriving packets. The packets are then communicated to the DPI module at step 402 where deep packet inspection is performed. As a result of the deep packet inspection, if the tunneled IPv6 packets are identified at block 404, they are switched for inspection at block 406. If the result of the inspection is negative for tunneled IPv6 packets, then IPv4 packets are passed to an IPv4 filter at block 408. If tunneled IPv6 packets are detected/identified at 404/406, they are passed to an IPv6 filter at block 410. The IPv4/IPv6 packet filters may operate as a firewall to provide an integrated collection of security measures designed to prevent unauthorized electronic access to the network access devices disposed behind the NAT, or may be configured to permit, deny, encrypt, decrypt, or proxy data traffic between different security domains based upon a set of rules and other criteria. As a system designed to prevent unauthorized access to or from a private network, the packet filter can be implemented in hardware, firmware and software, or a combination thereof. The packet filter examines each packet traversing the NAT and accepts or rejects it based on user-defined rules. If packet filter 408 blocks or restricts the flow of particular IPv4 packets at step 412, the packets are treated as specified by the filter rules and the process stops at step 414. If the packet filter rules do not block the IPv4 packet flow, the process jumps to step 416 and the IPv4 packets are subjected to the network address translation function in the NAT. At step 418, the IPv4 packets are passed to the egress interface from the NAT. IPv6 packets are filtered a block 410 and if blocked at step 420 based on the filter rules, the process stops at step 422. IPv6 packets that pass the filter are passed to the egress interface at step 424.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for filtering tunneled Internet Protocol version six traffic at a network address translation device, comprising:
    receiving an Internet Protocol tunneled traffic stream at an ingress network interface to the network address translation device;
    performing deep packet inspection on the Internet Protocol tunneled traffic stream without de-encapsulating any packets comprising the traffic stream, the deep packet inspection comprising inspecting both header and data payload of the packets comprising the traffic stream, the header comprising Internet Protocol version six, User Datagram Protocol, and Transmission Control Protocol Internet Protocol version four header information;
    detecting tunneled Internet Protocol version six packets responsive to the deep packet inspection; and
    applying an Internet Protocol version six filter to the Internet Protocol version six packets.

2. The method according to claim 1, wherein the Internet Protocol tunneled traffic stream comprises Internet Protocol version six in User Datagram Protocol encapsulated in Transmission Control Protocol Internet Protocol version four packets.

3. The method according to claim 1, wherein the deep packet inspection is to identify the Internet Protocol version six packets in the Internet Protocol tunneled traffic stream.

4. The method according to claim 1, further comprising separating Internet Protocol version four packets from the Internet Protocol tunneled traffic stream and applying an Internet Protocol version four packet filter to the Internet Protocol version four packets.

5. The method according to claim 1, wherein the deep packet inspection is performed in a coprocessor in the network address translation device.

6. The method according to claim 1, wherein a deep packet inspection module installed is programmed in the network address translation to identify Internet Protocol version six traffic in the Internet Protocol tunneled traffic stream received at the ingress interface to the network address translation device.

7. A network address translation device for filtering tunneled Internet Protocol version six traffic, comprising:
    a programmed processor comprising:
        an ingress network interface to receive an Internet Protocol traffic stream, the Internet Protocol traffic stream including Internet Protocol version four traffic and tunneled Internet Protocol version six traffic; and
        a deep packet inspection module coupled to the ingress interface to perform deep packet inspection on the traffic without de-encapsulating any packets comprising the traffic, the deep packet inspection comprising inspecting both header and data payload of the packets comprising the traffic stream, the header comprising Internet Protocol version six, User Datagram Protocol, and Transmission Control Protocol Internet Protocol version four header information, and to identify the tunneled Internet Protocol version six packets responsive to the deep packet inspection; and
    an Internet Protocol version six packet filter to filter the Internet Protocol version six packets.

8. The network address translation device according to claim 7, further comprising a switch to selectively route the tunneled Internet Protocol version six packets to the Internet Protocol version six filter.

9. The network address translation device according to claim 8, wherein the programmed processor is further to route Internet Protocol version four packets in the traffic to an Internet Protocol version four packet filter.

10. The network address translation device according to claim 7, wherein the deep packet inspection module comprises a coprocessor.

11. The network address translation device according to claim 7, wherein the deep packet inspection module is programmed in the network address translation device to identify Internet Protocol version six traffic in the Internet Protocol traffic stream.

12. A non-transitory memory medium including machine readable instructions encoded thereon, which when executed by a processor, cause a network address translation device to perform operations comprising:
   receiving an Internet Protocol tunneled traffic stream from an ingress network interface;
   performing deep packet inspection on the Internet Protocol tunneled traffic stream without de-encapsulating any packets comprising the traffic stream, the deep packet inspection comprising inspecting both header and data payload of the packets comprising the traffic stream, the header comprising Internet Protocol version six, User Datagram Protocol, and Transmission Control Protocol Internet Protocol version four header information;
   detecting tunneled Internet Protocol version six packets responsive to the deep packet inspection; and
   applying an Internet Protocol version six filter to the Internet Protocol version six packets.

13. The memory medium according to claim 12, wherein the Internet Protocol tunneled traffic stream comprises Internet Protocol version six in User Datagram Protocol encapsulated in Transmission Control Protocol Internet Protocol version four packets.

14. The memory medium according to claim 12, wherein the deep packet inspection identifies the Internet Protocol version six packets in the Internet Protocol tunneled traffic stream.

15. The memory medium according to claim 12, wherein the operations further comprise separating Internet Protocol version four packets from the Internet Protocol tunneled traffic stream and applying an Internet Protocol version four packet filter to the Internet Protocol version four packets.

16. The memory medium according to claim 12, wherein the deep packet inspection is performed in a coprocessor in the network address translation device.

* * * * *